United States Patent [19]
Eaton et al.

[11] Patent Number: 4,939,388
[45] Date of Patent: Jul. 3, 1990

[54] SECOND HARMONIC GENERATION BY INCLUSION COMPLEXES OF CYCLODEXTRIN COMPOUNDS

[75] Inventors: David F. Eaton; Ying Wang, both of Wilmington, Del.

[73] Assignee: E. I. dupont de Nemours and Company, Wilmington, Del.

[21] Appl. No.: 732,652

[22] Filed: May 10, 1985

[51] Int. Cl.$^5$ ............................ G02F 1/35; H01S 3/10
[52] U.S. Cl. ...................... 307/427; 372/22; 252/582; 252/600
[58] Field of Search .......................... 307/427; 372/22; 252/582

[56] References Cited

U.S. PATENT DOCUMENTS 4,041,323  8/1977  Stürmer .............................. 372/22
4,428,873  1/1984  Murayama .......................... 252/583

FOREIGN PATENT DOCUMENTS 0178427  9/1985  Japan ................................. 252/582

OTHER PUBLICATIONS

J. Zyss, "New Organic Molecular Materials for Nonlinear Optics" *Journal of Non-Crystalline Solids*, vol. 47, No. 2 (1982), pp. 211–226.

K. Harata, "The Structure of the Cyclodextrin Complex. V. . . . ", *Bulletin of the Chemical Society of Japan*, vol. 50(6), 1977, pp. 1416–1424.

Sigelle et al, "A New Material for Non-Linear Optics: 3-methyl-4-nitropyridine-1-oxide", J. Non Cryst. Solids 47, 2 (1982), 287–290.

Williams, "Organic Polymeric and Non-Polymeric Materials with Large Optical Nonlinearities", Angew Chem. Intl. Ed. Engl. 23 (1984), 690–703.

Davydov, "New Nonlinear Organic Materials . . . ", Sov. J. Quantum Electron., vol. 7, No. 1, Jan. 1977.

Harata et al, "Cyclodextrin–Nitrophenol VI", Chem. Soc. Jap. 51(6), 1627 (1978).

Harata, "Cyclodextrin–Methyl Orange II", Chem. Soc. Jap. 49(6), 1493 (1976).

*Primary Examiner*—Mary C. Lee
*Assistant Examiner*—Catherine S. Kilby Scalzo

[57] ABSTRACT

Inclusion complexes of cyclodextrin compounds and suitable guest molecules are capable of second harmonic generation when illuminated by coherent optical radiation.

19 Claims, 1 Drawing Sheet

SECOND HARMONIC GENERATION BY INCLUSION COMPLEXES OF CYCLODEXTRIN COMPOUNDS

BACKGROUND OF THE INVENTION

The present invention relates generally to nonlinear optical systems, and particularly to a new class of organic complexes capable of second harmonic generation.

The high light intensities available in coherent laser radiation have led to the development of nonlinear optical systems. The optical properties of materials are different at high intensities, since the electronic oscillators are driven so hard that anharmonic properties become evident. One such effect is harmonic generation of light, for example, conversion of red laser light to ultraviolet radiation of exactly doubled frequency. This effect known as second harmonic generation was first observed when quartz crystals were illuminated by laser radiation. Since this discovery, a number of inorganic and organic materials capable of second harmonic generation (SHG) have been discovered. A useful review of the state of the art relating to nonlinear properties of organic materials is provided by Williams, ed., *Nonlinear Optical Properties of Organic and Polymeric Materials*, (American Chemical Society 1983).

The nonlinear optical properties of organic and polymeric materials are currently under intensive study. Major research efforts are now directed towards searching for new molecules possessing large nonlinear polarizabilities and controlling molecular orientation on a microscopic level to influence bulk nonlinear optical properties. Over the past few years, research has indicated that organic molecules having conjugated pi electron systems or low-lying charge transfer excited states often possess extremely large second order polarizabilities. However, the potential of such molecules often cannot be utilized because of unfavorable alignment in the crystalline phase. In the case of SHG, second order susceptibility vanishes for centrosymmetric crystals.

A number of approaches have been taken to circumvent this problem. Use of a chiral molecule ensures formation of a noncentrosymmetric crystal and mathematically guarantees a nonvanishing second order susceptibility, but not necessarily a large one.

It has now been found that guest-host inclusion complexation can be used to control bulk nonlinear optical properties. Specifically, second harmonic generation by optically nonlinear aniline and aminopyridine compounds can be greatly enhanced by inclusion complexation with selected cyclodextrin compounds.

SUMMARY OF THE INVENTION

The present invention provides a nonlinear optical element capable of second harmonic generation, comprising an inclusion complex of a host compound selected from the group consisting of cyclodextrin compounds and substituted derivatives of cyclodextrin compounds, and a guest compound selected from the group consisting of anilines, pyridines, pyrimidines, quinolines, and naphthalenes. The present invention also provides methods of generating second harmonic radiation, comprising illuminating a nonlinear optical element as defined above with a source of coherent optical radiation.

BRIEF DESCRIPTION OF THE DRAWING

The FIGURE corresponds to the optical arrangement used to irradiate samples prepared for evaluation in the Examples.

DETAILED DESCRIPTION OF THE INVENTION

Figure 1:
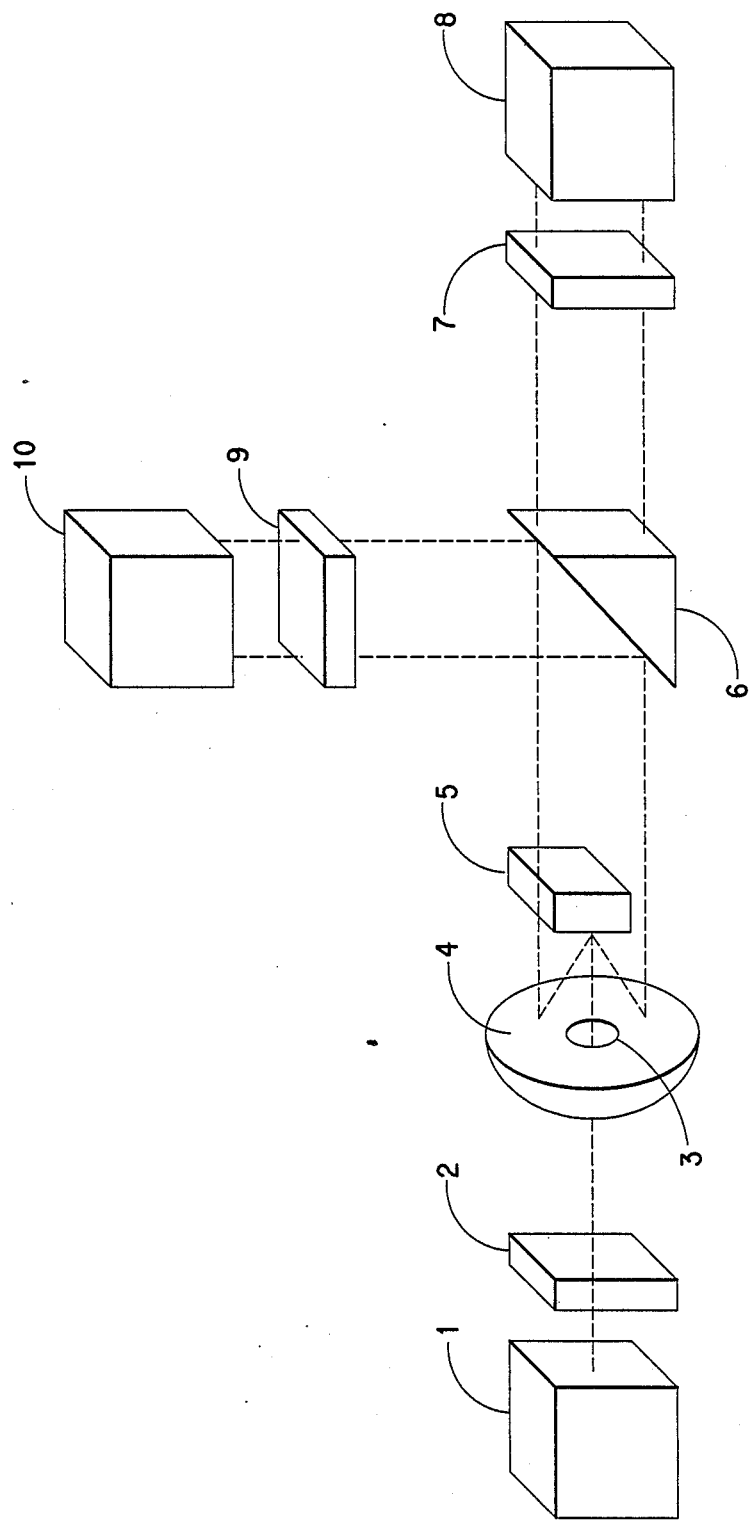

The nonlinear optical elements of the present invention comprise guest-host inclusion complexes of cyclodextrin compounds and certain optically nonlinear anilines, pyridines, pyrimidines, quinolines, and naphthalenes. Suitable guest molecules for complexation with a selected host are selected on the basis of knowledge of their molecular dimensions with respect to the cavity dimensions provided by a particular cyclodextrin host. Bender et al., *Cyclodextrin Chemistry* (Springer-Verlag, New York, 1978), pp 1–27, describe physical properties of cyclodextrins and inclusion complexes formed with cyclodextrins. This disclosure is hereby incorporated by reference. Bender et al. disclose that the known cyclodextrins exhibit the following internal cavity diameters:

| | |
|---|---|
| α-cyclodextrin | 4.5 Å |
| β-cyclodextrin | 7.0 Å |
| γ-cyclodextrin | 8.5 Å |

Accordingly, suitable guest molecules must be accommodated within a selected cyclodextrin host in a manner which results in the enhancement of nonlinear optical properties.

Useful cyclodextrin molecules for preparing the nonlinear optical elements of the present invention are α-, β-, and γ-cyclodextrin and certain substituted derivatives thereof. Preferred host compounds are β-cyclodextrin and substituted derivatives of β-cyclodextrin.

Useful guest molecules for preparing inclusion complexes with the foregoing host molecules are anilines, pyridines, pyrimidines, quinolines, and naphthalenes meeting the molecular size criterion specified above. In addition to this criterion a suitable guest molecule must possess a large molecular second order polarizability, that is, the molecule must exhibit a large dipole moment change from the ground state to the excited state, or low-lying charge transfer excited states. Spectroscopic measurements can be employed to determine in each case whether effective guest-host complexation occurs.

Preferred guest compounds are substituted amines of the formula

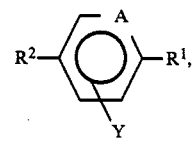

wherein
A is C or N;
$R^1$ is —$NH_2$, —$NHCH_3$, or —$N(CH_3)_2$;
$R^2$ is —$NO_2$ or —CN; and
Y is —H, —$CH_3$, —$OCH_3$, —OH, —F, or —Cl.

More preferred quest compounds are amines of the foregoing formula wherein Y is —H. Particularly preferred guest compounds are those wherein A is C.

For example, para-nitroaniline is a well-known optically nonlinear molecule having a large second order polarizability, but its macroscopic second order susceptibility vanishes in the centrosymmetric crystal habit. Formation of a 1:1 inclusion complex with β-cyclodextrin provides a powder with an SHG efficiency 2–4 times that exhibited by urea, a common organic reference material for SHG.

Generally, the molecular interaction by which guest-host complexation is obtained should exhibit directional selectivity for both guest and host to minimize orientational cancellation of bulk second order optical properties.

The preferred substituted amine derivatives described above exhibit a significant second order polarizability but a low bulk second order susceptibility. This group includes amines which exhibit charge transfer between donor and acceptor substituent groups. Exemplary are p-nitroaniline p-dimethylaminobenzonitrile, N-methyl-p-nitroaniline and N,N-dimethyl-p-nitroaniline, and 2-amino-5-nitropyridine. Preferred host molecules for formation of complexes with these amine derivatives are β-cyclodextrin and such substituted variants of β-cyclodextrin as dimethyl β-cyclodextrin.

Processes for producing the inclusion complexes employed in the present invention comprise mixing an aqueous solution of a selected host molecule with a preselected molar amount of a suitable guest molecule dissolved in an appropriate solvent, and allowing the resulting inclusion complex to precipitate as crystals from the reaction mixture. Suitable solvents of nitroaniline guest molecules include water and such organic solvents as diethyl ether, dimethylformamide, and dimethylsulfoxide. Of the foregoing water is preferred. Generally, solution temperatures ranging from 20° C to 100° C can be employed preferably 20° C to 30° C. To effect crystallization of the complex, the resulting solution can be cooled to a lower temperature, for example 0° C to 5° C.

The following examples illustrate selected aspects of the present invention. In the Examples, all parts and percentages are by weight unless otherwise indicated and all degrees are Celsius (°C).

Experimental Procedure

Samples prepared for evaluation in the following examples were irradiated by a Nd-YAG laser, using an optical arrangement corresponding to that depicted in the FIGURE. As indicated in the FIGURE, filter 2 was employed to adjust the intensity of the monochromatic signal provided by Nd-YAG laser 1. The resulting beam was directed through a cental hole 3 in parabolic mirror 4, illuminating a powder sample 5. Light emerging from sample 5 was collected by mirror 4, and transmitted to a beam splitter 6, which divided the signal into two parts. One part was passed through a narrow band filter 7, having a full-width half maxima of 10 nm, centered at a second harmonic wavelength to be detected. The signal passing through filter 7 was detected by photomultiplier 8. The other beam provided by beam splitter 6 was directed through a broad band filter 9, having a full-width half maxima of 70 nm and detected by a second photomultiplier 10. Thus, in each experiment two channel detection enabled discrimination against potential spurious signals from the sample.

In each experiment, polycrystalline urea powder having an average particle size of 90 to 125 μm was used as a reference material. The intensity of the second harmonic radiation generated by each sample tested was thus measured relative to that provided by urea.

EXAMPLE 1

A mixture of near-saturated aqueous solutions of β-cyclodextrin and p-nitroaniline was stirred overnight. The resulting precipitated complex was collected and dried in air, then tested for second harmonic generation. The measured SHG efficiency was about 70% of that provided by urea.

Control experiments indicated that neither β-cyclodextrin nor p-nitroaniline alone were active.

The experiment was repeated except that β-cyclodextrin was replaced with α-cyclodextrin and γ-cyclodextrin, respectively. Neither of these compounds provided complexes with p-nitroaniline which were SHG active.

EXAMPLES 2–15

In Examples 2–15, which are summarized in Table I, below, the experiment described in Example 1 was substantially repeated, using complexes prepared using varying molar ratios of p-nitroaniline (p-NA) and β-cyclodextrin (β-CD). In each experiment, solutions of p-NA and β-CD were gently heated to facilitate dissolution, and the resulting solutions were cooled slowly to precipitate crystalline complexes. In some experiments crystalline complexes were dried by heating in an oven at 60° to 70° for several days. In the experiments described below as Examples 6 and 7, samples prepared and tested as Examples 3 and 5 were dried at 60° to 70° for an additional 2 weeks and then held at about 23° for 3 weeks prior to testing.

TABLE I

Examples 2-15: Second Harmonic Generation by Various Samples of p-Nitroaniline/β-Cyclodextrin Crystalline Inclusion Complexes

| Example | Molar Ratio: β-CD/p-NA | Complex Drying Conditions | SHG Relative to Urea |
|---|---|---|---|
| 2 | 0.5 | Air | 0.5 |
| 3 | 0.5 | Oven | 1.0 |
| 4 | 1.0 | Air | 2.4 |
| 5 | 1.0 | Oven | 4.2 |
| 6 | 1.0 | Oven | 0.6 |
| 7 | 0.5 | Oven | 2.0 |
| 8 | 1.82 | Air | 0.2 |
| 9 | 0.69 | Air | 2.2 |
| 10 | 3.70 | Air | 0.0 |
| 11 | 1.0 | Air | 3.5 |
| 12 | 0.69 | Air | 2.2 |
| 13 | 0.5 | Air | 0.77 |
| 14 | 0.33 | Air | 2.2 |
| 15 | 0.25 | Air | 1.0 |

EXAMPLE 16

In this experiment the procedure employed in Example 2, above, was substantially repeated except that p-nitroaniline was replaced with p-N,N-dimethylaminobenzonitrile (DMABN) to provide a molar ratio of β-cyclodextrin to DMABN of 1.0. The resulting complex was dried in air, and then tested for second harmonic generation. The SHG signal measured was approximately 1.56 per cent of that provided by a urea control.

EXAMPLES 17–22

In this series of experiments, 2.0 g (1.8 mmol) β-cyclodextrin were dissolved in 100 mL distilled water, and the resulting solution filtered though a medium glass frit. Meanwhile, a p-nitroaniline derivative to be employed as a guest molecule was dissolved in a minimum quantity of diethyl ether (typically 30-75 mL) and the resulting solution filtered. The foregoing two filtrates were then combined, and the resulting mixture stirred overnight in an open flask. Any resulting solids were then separated by filtration to provide a first crop (Crop 1), and the filtrate was then held at 5° for about 24 hours. Any additional precipitate (Crop 2) was then separated by filtration. In this manner, guest-host complexes of β-cyclodextrin and N-methyl-p-nitroaniline (p-NMeA), N,N-dimethyl-p-nitroaniline (p-NDMeA), and p-nitroaniline (p-NA) were obtained. Each complex was then tested for SHG by procedures substantially similar to those previously described. The results obtained are set forth in Table II, below.

The melting points of the complexes obtained are also set forth in Table II. All complexes melted with decomposition. In Example 20, five crops of product complexes were obtained. The first crop exhibited a very low melting point and was discarded. The sample designated "Crop 1" in Table II was prepared by combining the second and third crops, and the sample designated "Crop 2" in Table II was prepared by combining the fourth and fifth crops obtained. As a control in these experiments. N-dimethyl-p-nitroaniline was evaluated by itself, rather than as a complex with β-cyclodextrin. This control experiment is designated by the letter "A" in Table II, below.

TABLE II

Second Harmonic Generation by Guest-Host Complexes of β-Cyclodextrin and Selected Derivatives of p-Nitroaniline

| Example | Guest | Yield (g) Crop 1 | Crop 2 | Melting Point (°C.) | SHG Relative to Urea |
|---|---|---|---|---|---|
| 17 | P-NMeA | 0.15 | 0.45 | 277–285 | 1.0 |
| 18 | p-NDMeA | 1.80 | — | 278–282 | 0.0 |
| 19 | p-NA | 0.13 | 0.55 | 288–289 | 1.0 |
| 20 | p-NMeA | 0.25 | 0.61 | 285–288 | 0.25 |
| 21 | p-NDMeA | 1.99 | — | 274–285 | 0.10 |
| 22 | p-NDMeA | — | — | — | 0.13 |
| A | — | — | — | — | 0.5 |

EXAMPLE 23:

Characterization of p-Nitroaniline-β-Cyclodextrin Guest-host Complex

A. Equilibrium Constant

The absorption spectra of p-nitroaniline in the presence of varying amounts of β-cyclodextrin in aqueous solution show an isosbestic point, indicating complex formation. The formation constant of the complex was determined to be 160 $M^{-1}$. B. Circular Dichroism The absorption spectrum of p-nitroaniline in aqueous solution shows induced-circular dichroism upon addition of β-cyclodextrin and α-cyclodextrin (positive Cotton effect). This indicates that the long molecular axis of p-nitroaniline is aligned with the cavity axis of β-cyclodextrin and α-cyclodextrin.

C. NMR

Proton NMR spectra obtained for complexes of β-cyclodextrin and p-nitroaniline indicate that interior protons, H-3 and H-5, of β-cyclodextrin move upfield upon addition of p-nitroaniline, while exterior protons H-1, H-2, and H-4 remain relatively unchanged. This indicates that p-nitroaniline is included within the B-cyclodextrin cavity, rather than associated with the periphery of the cyclodextrin structure. The protons meta to the amino group of p-nitroaniline move upfield by about 0.06 ppm upon complexation, while the ortho protons remain relatively unchanged. This suggests that p-nitroaniline enters the β-cyclodextrin cavity preferentially from the nitro side.

D. X-Ray Diffraction

The powder x-ray diffraction patterns obtained for β-cyclodextrin, p-nitroaniline, and complexes of β-cyclodextrin and p-nitroaniline are different. These results suggest that the guest-host complexes can be visualized as an oriented inclusion compound of the aniline derivative and the toroidal cyclodextrin. The cyclodextrin is nonsymmetric about the axis normal to its toroidal axis, and insertion of the aniline derivative occurs with a preferential orientation relative to this asymmetry. Because cyclodextrin itself is chiral, its crystals and those of cyclodextrin complexes will be non-centrosymmetric, and thus exhibit anisotropy along at least one crystal axis. The non-random dipole orientation within the chiral cavity will then result in a bulk dipolar anisotropy in crystals of the complex, which is a necessary precondition for second harmonic generation.

Example 24

A 1:1 molar mixture of β-cyclodextrin and 2-amino-5-nitropyridine was prepared in water and gently heated to facilitate dissolution. The resulting solution was cooled slowly to precipitate a crystalline complex. After drying in air, the complex exhibited an SHG efficiency of 7% of that shown by urea.

What is claimed is:

1. A nonlinear optical element capable of secondary harmonic generation, comprising an inclusion complex of a host compound selected from the group consisting of cyclodextrin compounds and substituted derivatives of cyclodextrin compounds, and a guest compound selected from the group consisting of

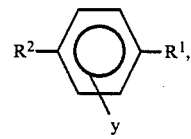

pyridines, pyrimidines, quinolines, and naphthalenes.

2. A nonlinear optical element of claim 1, wherein the host compound is β-cyclodextrin.

3. A method of generating second harmonic radiation, comprising illuminating with coherent optical radiation a nonlinear optical element comprising an inclusion complex of a host compound selected from the group consisting of cyclodextrin compounds and substituted derivatives of cyclodextrin compounds, and a guest compound selected from the group consisting of anilines, pyridines, pyrimidines, quinolines, and naphthalenes.

4. The method of claim 3 wherein the host compound is selected from the group consisting of β-cyclodextrin and substituted derivatives of β-cyclodextrin, and the guest compound is a compound of the formula

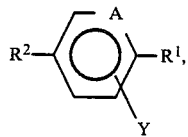

wherein
A is C or N;
$R^1$ is —$NH_2$, —$NHCH_3$, or —$N(CH_3)_2$;
$R^2$ is —$NO_2$ or —CN; and
Y is —H, —$CH_3$, —$OCH_3$, —OH, —F or —Cl.

5. The method of claim 4 wherein Y is —H.
6. The method of claim 5 wherein the host compound is β-cyclodextrin.
7. The method of claim 6 wherein A is C.
8. The method of claim 7 wherein $R^2$ is —$NO_2$.
9. The method of claim 8 wherein $R^1$ is —$NH_2$.
10. The method of claim 9 wherein $R^1$ is —$NHCH_3$.
11. The method of claim 10 wherein $R^1$ is —$N(CH_3)_2$.
12. A second harmonic generator comprising a laser source of coherent light radiation at a fixed fundamental frequency, a non-centrosymmetric inclusion complex comprising an inclusion complex of a host compound selected from the group consisting of cyclodextrin compounds and substituted derivatives of cyclodextrin compounds, and a guest compound selected from the group consisting of anilines of the formula

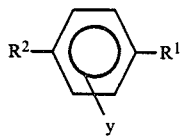

wherein $R^1$ is —$NH_2$, —$NHCH_3$, or —$N(CH_3)_2$
$R^2$ is —$NO_2$, and
Y is H or $CH_3$, means for directing the output radiation of the laser onto the complex, and output means for utilizing the second harmonic frequency, said complex being transparent to radiation at said fixed fundamental frequency and said second harmonic frequency.

13. A nonlinear optical element capable of secondary harmonic generation, comprising an inclusion complex of a host compound selected from the group consisting of cyclodextrin compounds and substituted derivatives of cyclodextrin compounds, and a guest compound selected from the group consisting of anilines of the formula

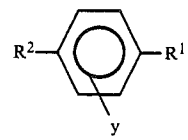

wherein $R^1$ is —$NH_2$, —$NHCH_3$, or —$N(CH_3)_2$; $R^2$ is —$NO_2$ or —CN; and Y is —H, —$CH_3$, —$OCH_3$, —OH, —F or —Cl.

14. The nonlinear optical element of claim 13 wherein Y is —H.
15. The nonlinear optical element of claim 14 wherein the host compound is β-cyclodextrin.
16. The nonlinear optical element of claim 15 wherein $R^2$ is —$NO_2$.
17. The nonlinear optical element of claim 16 wherein $R^1$ is —$NH_2$.
18. The nonlinear optical element of claim 16 wherein $R^1$ is —$NHCH_3$.
19. The nonlinear optical element of claim 16 wherein $R^1$ is —$N(CH_3)_2$.

* * * * *